July 14, 1931.  C. H. OHLRICH  1,814,957
AIRCRAFT
Filed Dec. 13, 1929   3 Sheets-Sheet 1
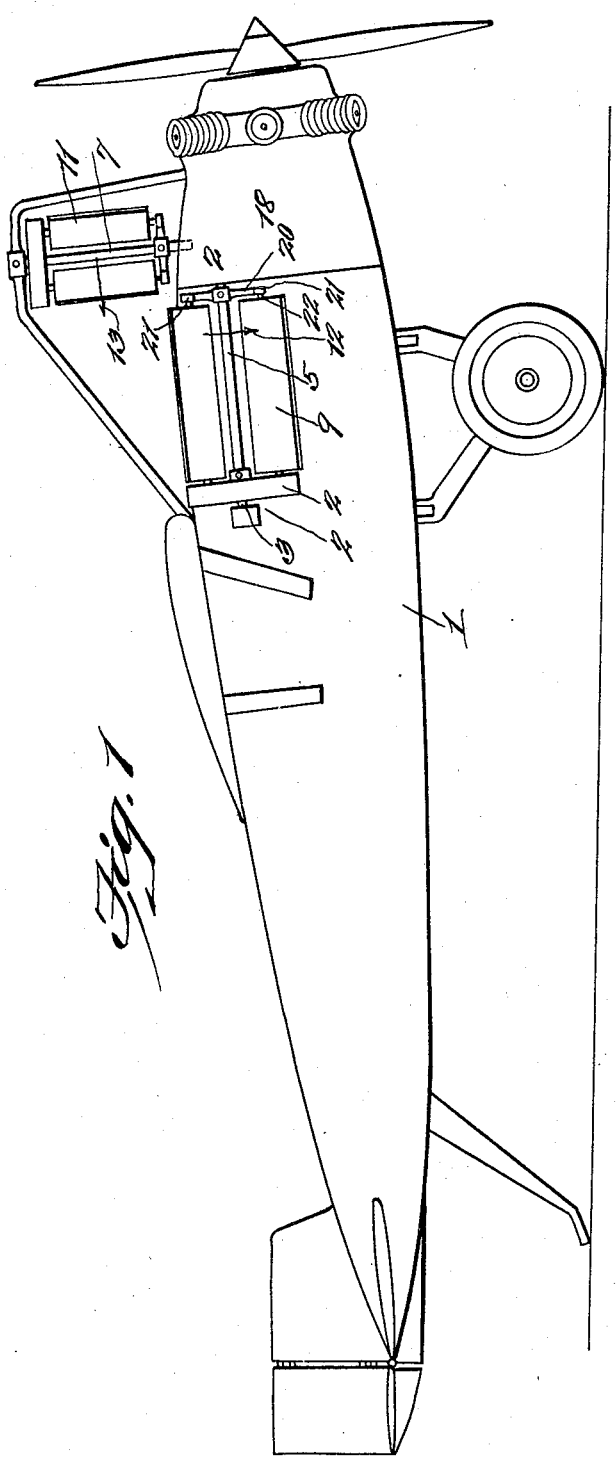
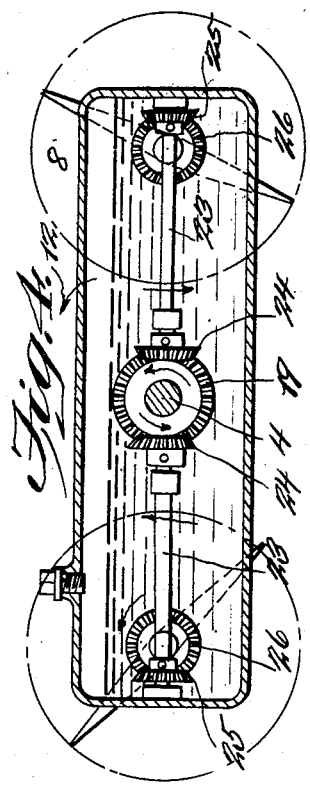
Charles H. Ohlrich INVENTOR
BY Victor J. Evans
ATTORNEY

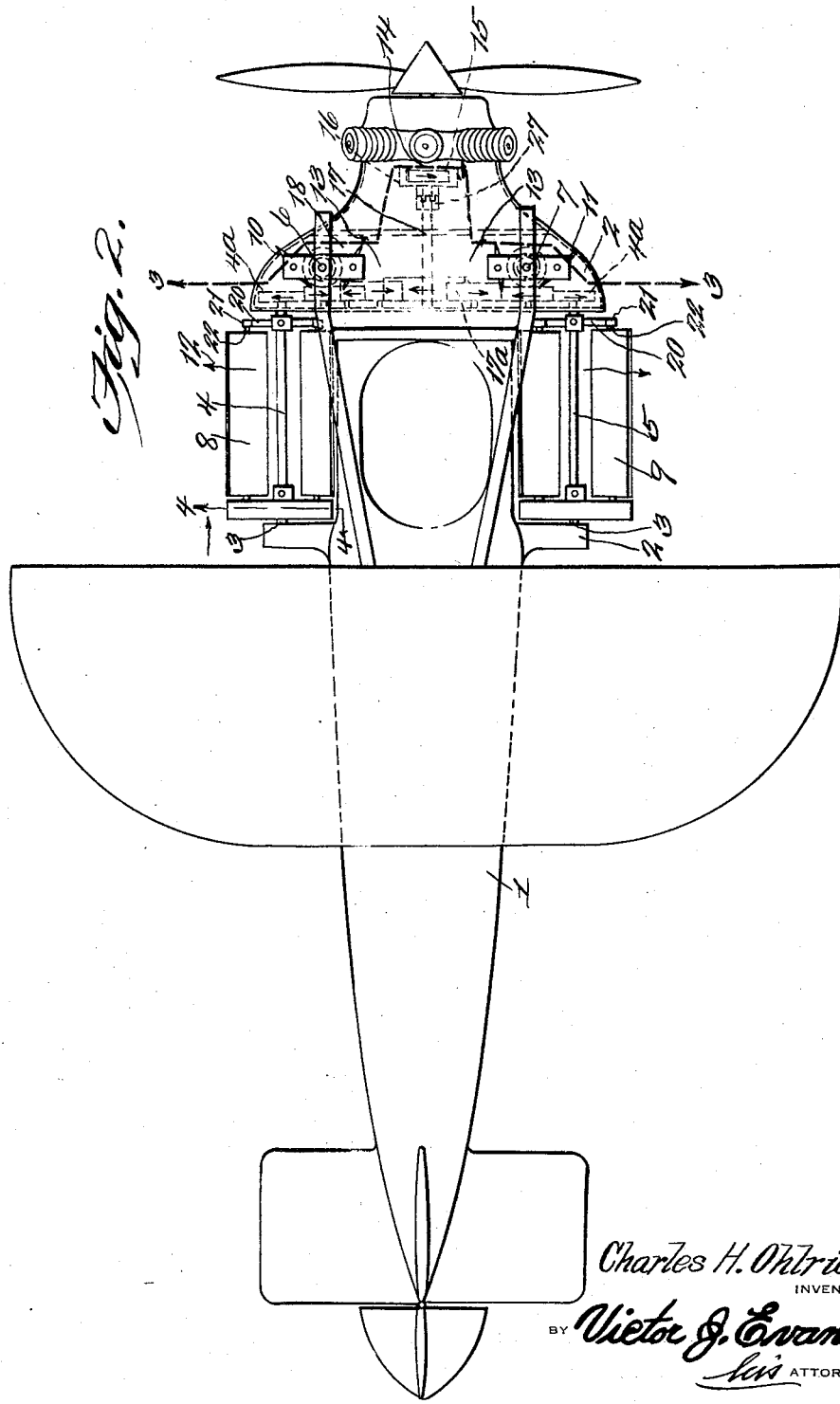

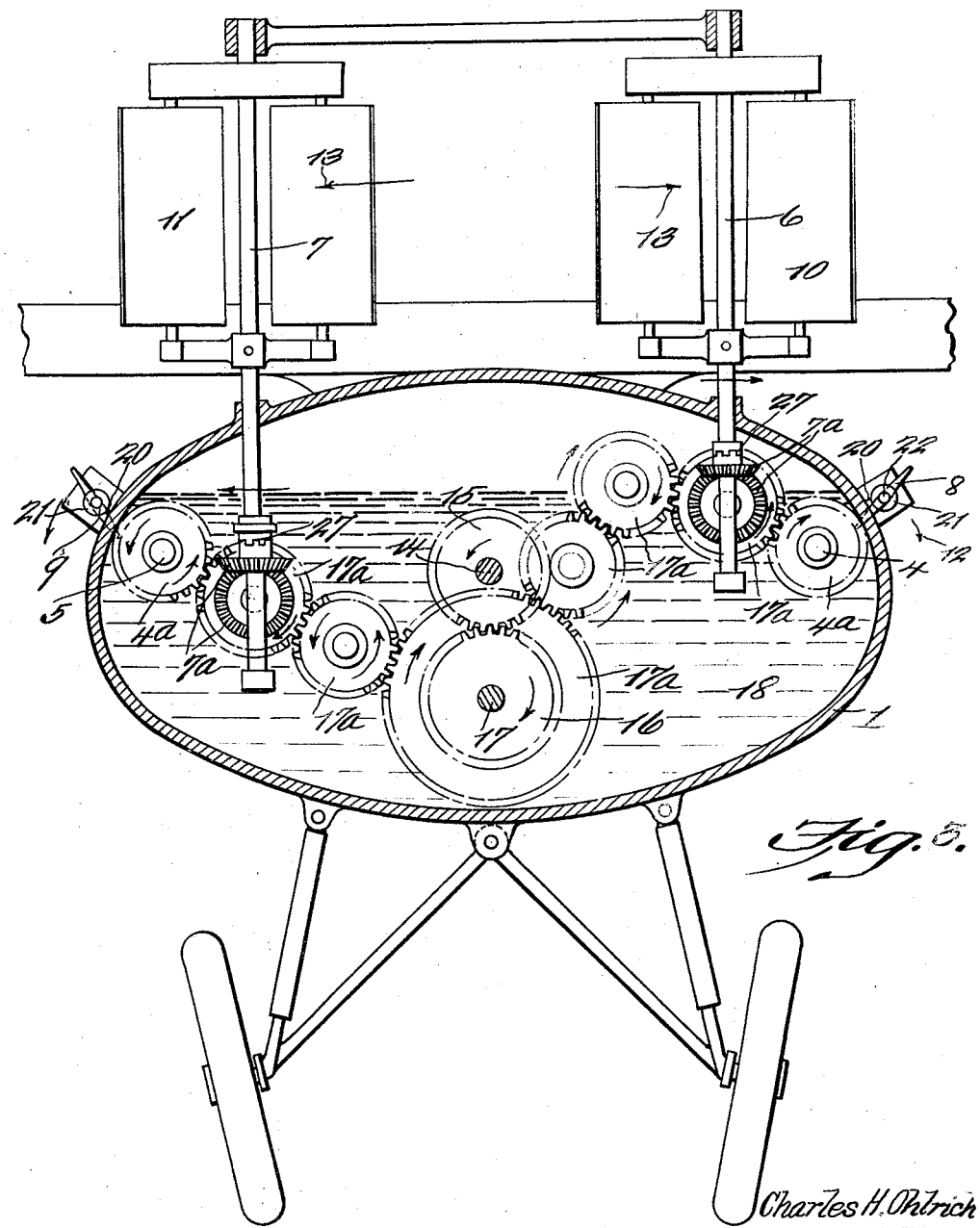

Patented July 14, 1931

1,814,957

UNITED STATES PATENT OFFICE

CHARLES H. OHLRICH, OF PHILADELPHIA, PENNSYLVANIA, ASSIGNOR OF ONE-HALF TO LOUIS W. HUMMEL, OF PHILADELPHIA, PENNSYLVANIA

AIRCRAFT

Application filed December 13, 1929. Serial No. 413,857.

This invention relates to aircrafts, and especially to the helicopter type, the purpose being to cause the ascension of the craft approximately perpendicularly by means of propellers capable of rotating under and toward, and over and outwardly, each propeller having blades which feather the air as the propellers rotate under and toward each other, especially on the rise of the blades, which then start to assume horizontal positions as the propellers rotate over and away from each other, the blades when moving downwardly assuming full horizontal positions and act on the air, causing ascension of the craft.

Another purpose is to provide an improved frame made rigid with the fuselage for the support of the propellers, in conjunction with gearing, operatively associated with the motor, for the purpose of imparting movement to the propellers.

Another purpose is to provide a housing for the gearing between the propeller shafts and the motor shaft.

Another feature of this type of aircraft is that the blades of each propeller include gearing with the propeller shaft, so as to cause the blades to feather the air when the propellers are rotating under and toward each other, and then gradually move into horizontal positions, and gradually back into feathering positions, so that the blades will act upon the air and cause ascension of the craft.

A further feature is the provision of housings for the gears between the blades and the propeller shafts, and which housings contain oil, to keep the gearing well lubricated, said housing also serving to protect the gearings against weather conditions.

A still further purpose is to provide a craft equipped with similar propellers for causing the aircraft to travel forwardly.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1 is a view in side elevation showing the aircraft constructed in accordance with the invention.

Figure 2 is a plan view of same.

Figure 3 is a sectional view on line 3—3 of Figure 2 through the gear housing at the front of the aircraft.

Figure 4 is a sectional view through one of the gear housings at the rear of each propeller.

Referring to the drawings, 1 identifies the fuselage of the aircraft and 2 is a frame made rigid with the fuselage, said frame having bearings 3 for the propeller shafts 4 and 5 and 6 and 7. The shafts 4 and 5 carry propellers 8 and 9, while the shafts 6 and 7 carry propellers 10 and 11.

The propellers 8 and 9 operate under and toward each other as indicated by the arrows 12, causing ascension of the craft, while the propellers 10 and 11 operate forwardly and toward each other for the purpose of causing the craft to travel forwardly, arrows 13 indicating the direction of movement.

The fuselage carries a motor shaft 14 having a gear 15, meshing with a gear 16 on the forward end of the shaft 17, which in turn is connected by a train of gears 17a with gears 4a on the propeller shafts 4 and 5. A suitable gear housing 18 is provided for the gears 15, 16, 4a and 17a, and contains oil or lubricant, to not only keep the gears well lubricated, but the housing serving to protect the gears from the weather.

The rear ends of the propeller shafts 4 and 5 carry bevel pinions 19. Each of the propellers 8 and 9 consist of cross pieces 20, in bearings 21 of which the pintles 22 of the propeller blades 8 and 9 are mounted. The cross pieces at the rear of the propellers 8 and 9 have bearings for shafts 23, with bevel gears 24 on their adjacent ends and bevel gears 25 on their remote ends. The adjacent beveled gears 24 mesh with the beveled gears 19, while the remote beveled gears 25 mesh with beveled pinions 26 on the rear pintles of the blades.

By the above gearing and the gearing at the forward ends of the blades including the gear 15 power is transmitted to the propellers and to the blades, the gearing with the rear of the blades being of such ratio as to cause the propellers to move under and toward each other, and then over and outwardly away from each other, the blades in moving toward and then upwardly acting to feather the air, and then act outwardly and downwardly on the air, hence causing the aircraft to ascend.

The propeller shafts 7 are connected by bevel gears 7a to certain gears of said train of gears 17a, however the propellers 10 and 11 having similar gearing act to propel the aircraft forwardly.

Suitable clutch mechanisms are provided, one on each of the propeller shafts 7 and one on the shaft 17, so that when one of the clutch mechanisms 27 is out of gear and the other clutch mechanism in gear, the propellers for causing ascension of the craft are operated, and when the craft has reached the height desired by the pilot the clutch mechanism which is out of gear is thrown into gear, causing the other propellers to impart forward travel to the craft.

The aircraft is equipped with the usual wings as shown, and also the usual stabilizing members.

The invention having been set forth, what is claimed is:

1. In an aircraft, the combination with a fuselage having a motor and a motor shaft, of a frame rigid with the fuselage, ascension propellers operatively mounted on and associated with the frame and gearing operatively connecting the propellers with the motor shaft, each of said propellers comprising a propeller shaft having cross pieces at its ends, blades mounted in said cross pieces, gearing operatively connecting the blades of each propeller with the propeller shaft, whereby the propellers may rotate under and toward each other then upwardly and outwardly from each other and then downwardly, the blades in ascending substantially to moving under and toward each other acting to feather the air, and housings for the forward and rear gearing and adapted to contain oil or other lubricant to cause free operation of the gearing.

2. In an aircraft, the combination with a fuselage having a motor and a motor shaft, of a frame on the fuselage, ascension propellers carried by the frame and being geared to the motor shaft, said propellers comprising blades, and means inter-gearing the blades of each propeller, whereby the blades may move under and toward each other, upwardly and outwardly away from each other, and propelling means operatively connected with the motor shaft for causing the craft to travel forward, and housings for the gearing at the rear ends of the propellers and adapted to contain oil to insure free movement of the gearing.

3. In an aircraft, the combination with a fuselage having an oil housing at its forward portion and a motor shaft passing through the housing, of a frame on the fuselage, ascension propellers on said frame, forward propulsion propellers on the frame, each of said propellers comprising a propeller shaft having cross pieces at its ends, one of the cross pieces of each propeller being hollow and carrying oil, gearing in each hollow cross piece and interconnecting the propeller shaft and said propellers to insure freedom of movement, and gearing in the oil housing and connecting the motor shaft and the propeller shafts, thereby insuring freedom of movement of the parts between the motor shaft and the propellers.

4. In an aircraft, the combination with a fuselage having an oil housing at its forward portion and a motor and a motor shaft, the latter passing through the housing, of a frame on the fuselage, ascension propulsion means arranged in said frame and including horizontal shafts, forward traveling propulsion means mounted in said frame and having vertical shafts, and gearing means in the oil housing and operatively connecting all of said shafts of said propulsion means, thereby insuring free movement of the gearing means.

In testimony whereof he affixes his signature.

CHARLES H. OHLRICH.